No. 822,530. PATENTED JUNE 5, 1906.
L. P. LOWE.
COUPLING FOR GLASS TUBES.
APPLICATION FILED AUG. 8, 1905.

UNITED STATES PATENT OFFICE.

LEON P. LOWE, OF SAN FRANCISCO, CALIFORNIA.

COUPLING FOR GLASS TUBES.

No. 822,530.  Specification of Letters Patent.  Patented June 5, 1906.

Application filed August 8, 1905. Serial No. 273,312.

*To all whom it may concern:*

Be it known that I, LEON P. LOWE, a citizen of the United States, residing at San Francisco, in the county of San Francisco and State of California, have invented certain new and useful Improvements in Couplings for Glass Tubes, of which the following is a specification.

This invention relates to a coupling for glass tubes such as are used in laboratory work, the object of the invention being to provide means whereby the ends of two tubes can be very quickly joined together so as to make a very tight joint.

Figure 1:
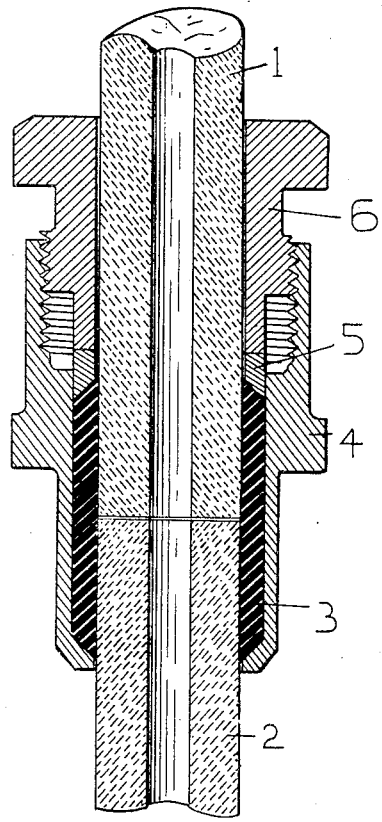
Figure 2:
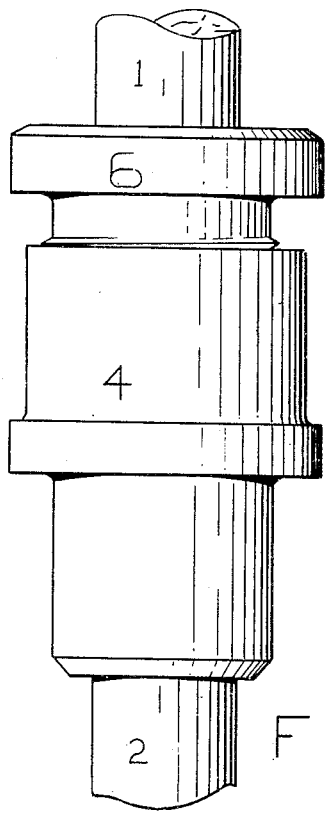
Figure 3:
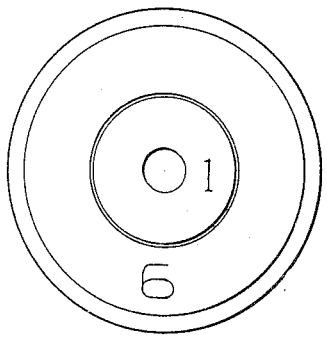

In the accompanying drawings, Figure 1 is a longitudinal section of the ends of two tubes and of the coupling joining the same. Fig. 2 is a side elevation thereof. Fig. 3 is a plan view.

Referring to the drawings, 1 2 represent two glass tubes, the ends of which are to be joined so as to make a perfectly-tight joint. Upon the end of the tube 1 is placed a short sleeve 3, of rubber, and the end of the other tube 2 is inserted into the open end of the sleeve 3 and pushed inward until the ends of the tubes 1 2 abut against each other. A coupling member 4, of brass or other suitable material, which has been previously placed over the tube 2 is now moved over or around the rubber sleeve 3, so that the contracted end thereof fits against the outer end of the sleeve 3. A ring 5, of brass or other suitable metal, having an undercut beveled inner end, is then slipped over the tube 1 and placed against the end of the sleeve 3. The member 4 fits snugly around the sleeve 3 and ring 5. The other coupling member 6 is then moved along the tube 1 until its square end abuts against the square surface of the ring 5, being at the same time screwed into the internally-enlarged threaded portion of the coupling member 4. By this means the rubber sleeve 3 is very tightly compressed around the tubes 1 and 2 and a perfectly-tight joint is formed.

By the provision of the metal ring 5 sliding snugly within the reduced smooth bore of the member 4 and having an undercut beveled inner end and the coupling member 6 screwed against said ring 5 great force can be efficiently exerted to compress the rubber sleeve around the glass tubes and a tight packing effected.

I claim—

A coupling for the end of tubes, comprising a rubber sleeve around the ends of the tubes, a ring of metal around one of the tubes having an undercut beveled end abutting against one end of the sleeve, a coupling member having a reduced smooth bore closely fitting around said rubber sleeve and metal ring and having a contracted end to confine the other end of the rubber sleeve, and having also an internally-enlarged threaded portion, and a second coupling member screwed into said enlarged portion, its inner end abutting against said metal ring, substantially as described.

In witness whereof I have hereunto set my hand in the presence of two subscribing-witnesses.

L. P. LOWE.

Witnesses:
FRANCIS M. WRIGHT,
BESSIE GORFINKEL.